Feb. 16, 1932.                M. C. LARSON ET AL                1,845,425
                                    BEARING
                        Filed May 22, 1931        4 Sheets-Sheet 1
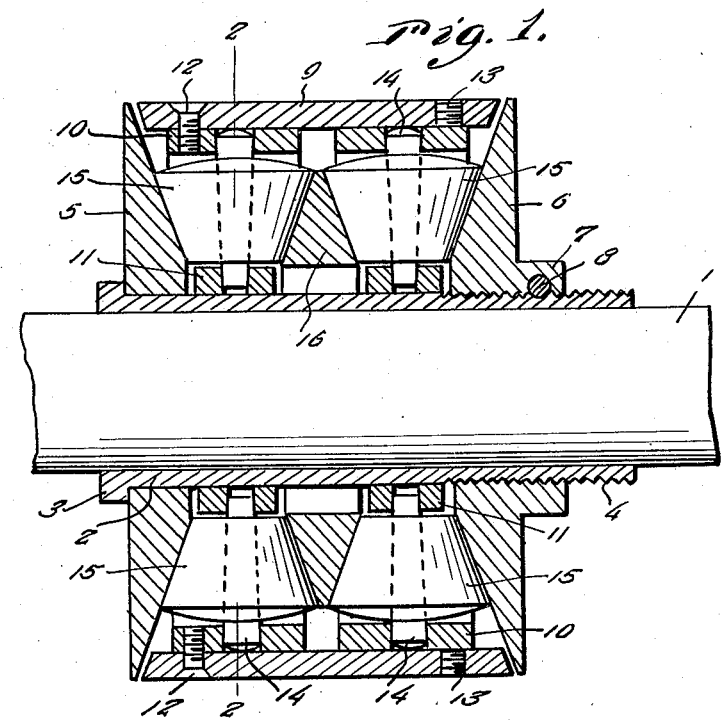
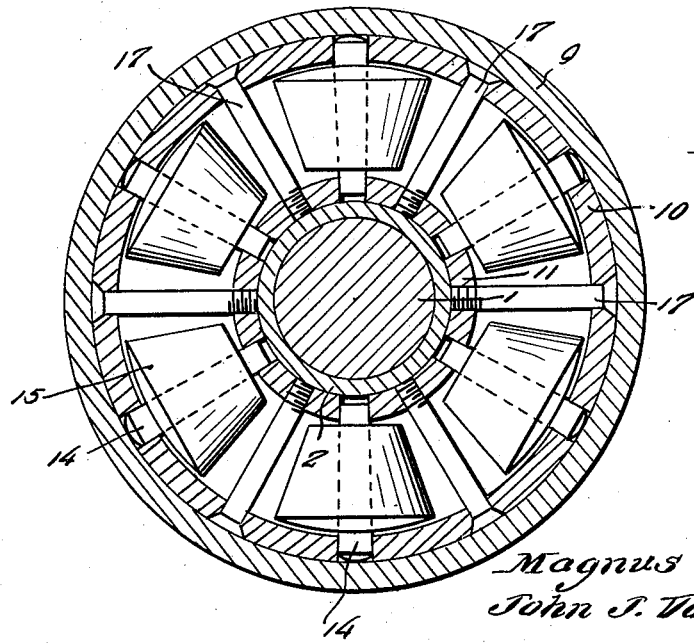
Inventors
Magnus C. Larson
John J. Volansky
By Clarence A. O'Brien
                Attorney Inventors
Magnus C. Larson
John J. Volansky
By Clarence A. O'Brien
Attorney Feb. 16, 1932.  M. C. LARSON ET AL  1,845,425
BEARING
Filed May 22, 1931   4 Sheets-Sheet 3
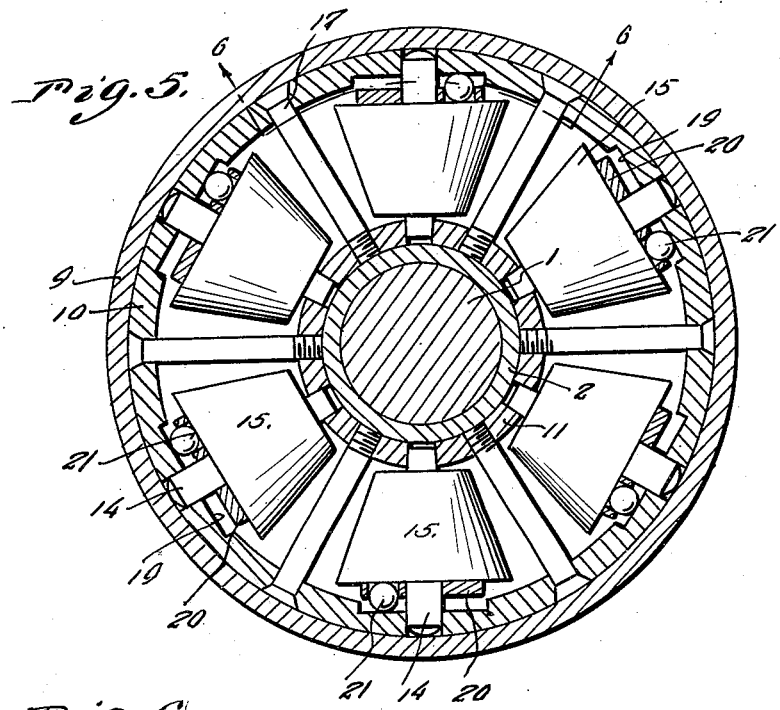
Fig. 5.
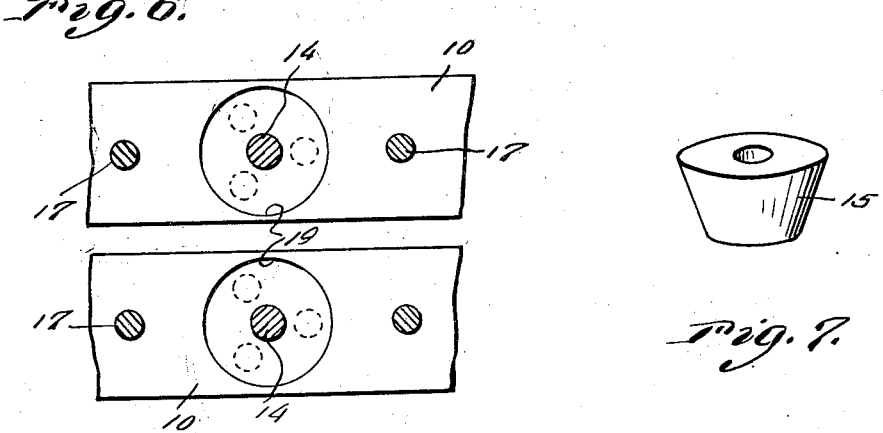
Fig. 6.
Fig. 7.
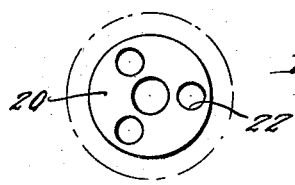
Fig. 8.
Inventors
Magnus C. Larson
John J. Tolansky
By Clarence A. O'Brien
Attorney Feb. 16, 1932.    M. C. LARSON ET AL    1,845,425
BEARING
Filed May 22, 1931    4 Sheets-Sheet 4

Inventors
Magnus C. Larson
John J. Volansky
By Clarence A. O'Brien
Attorney

Patented Feb. 16, 1932

1,845,425

UNITED STATES PATENT OFFICE

MAGNUS C. LARSON, OF HEMPSTEAD, NEW YORK, AND JOHN J. VOLANSKY, OF POTTSVILLE, PENNSYLVANIA

BEARING

Application filed May 22, 1931. Serial No. 539,344.

The present invention relates generally to bearings and more particularly to new and useful improvements in anti-friction bearings and has for one of its important objects to provide, in a manner as hereinafter set forth, a bearing of this character embodying a novel construction and arrangement of parts whereby both longitudinal and radial thrust will be successfully resisted.

Another important object of the invention is to provide a bearing of the character described embodying a novel construction, combination and arrangement of elements through the medium of which the bearing may be expeditiously adjusted to compensate for wear which may occur when the bearing is in use.

All of the foregoing and still further objects and advantages of the invention will become apparent from a study of the following specification, taken in connection with the accompanying drawings, wherein like characters of reference designate corresponding parts throughout the several views, and wherein:—

Figure 1 is a view in vertical longitudinal section through a bearing constructed in accordance with the present invention.

Figure 2 is a view in vertical cross section taken substantially on the line 2—2 of Figure 1.

Figure 5 is a view in vertical cross section of another modification of the invention.

Figure 6 is a fragmentary view in section taken substantially on the line 6—6 of Figure 5.

Figure 7 is a detail view in perspective of one of the tapered rollers.

Figure 8 is a detail view in plan of one of the cages of the ball thrust bearings which are provided for the tapered rollers in the form of the invention illustrated in Figure 5.

Figure 3:
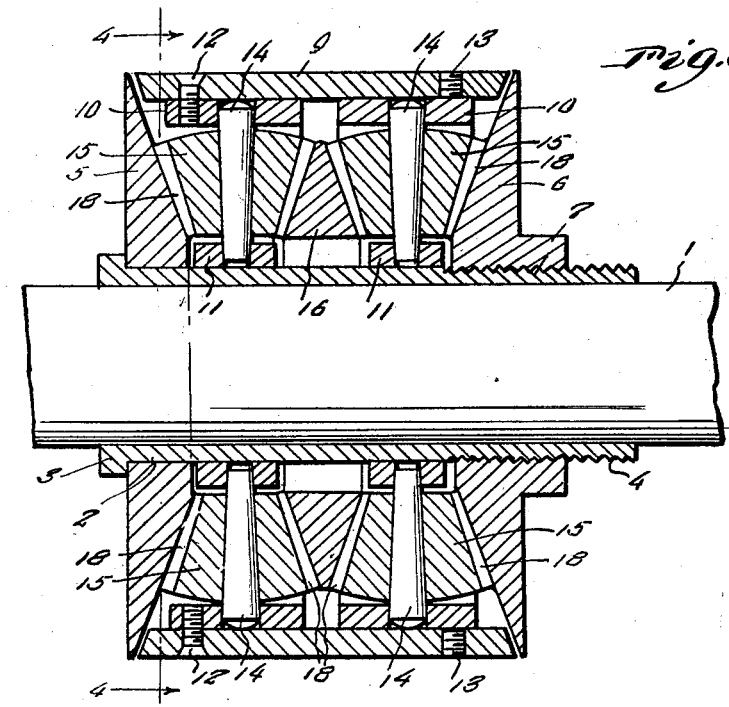
Figure 3 is a view in vertical longitudinal section through a modified form of the bearing.

Referring now to the drawings in detail, it will be seen that the reference numeral 1 designates a portion of a shaft. The bearing comprises a sleeve 2 which is mounted on the shaft 1 and which is provided with an external flange 3 on one end. The other end portion of the sleeve 2 is externally threaded, as at 4.

A disk 5 having a conical inner face is mounted on the sleeve 2 in abutting engagement with the flange 3. A disk 6, also having a conical inner face, is threaded for adjustment on the end portion 4 of the sleeve and has projecting outwardly therefrom a polygonal head or boss 7 for engagement by a suitable actuating tool such as a wrench to facilitate adjustment of the disk on the sleeve. Suitable means such as a locking pin 8 may be provided for securing the disk 6 in adjusted position.

The reference numeral 9 designates a stationary casing in the form of an annulus which is disposed between the outer marginal portions of the disks 5 and 6 in spaced relation thereto to permit adjustment of said disks 5 and 6 toward each other. The edges of the annulus 9 are tapered to conform to the taper of the inner faces of the disks 5 and 6.

Fixed within the annulus 9 between the disks 5 and 6 are the pairs of inner and outer rings 10 and 11, respectively, the inner rings 11 being of less width than the outer rings 10 and rotatably encircling the sleeve 2. The outer ring 10 which is adjacent the disk 5 is fixed to the annulus 9 by suitable means such as screws 12 while the other outer ring 10 is adjustably secured in the annulus 9 by set screws 13 which are threaded through said annulus and engaged with the outer periphery of said other outer ring.

The pairs of outer and inner rings 10 and 11 are provided with radially aligned tapered openings in which the end portions of the tapered pins 14 are journaled, the outer end portions of said pins being rounded and bearing against the inner periphery of the annulus 9. Tapered rollers 15 are mounted on the pins 14 between the outer and inner rings 10 and 11 and said rollers 15 have rolling contact with the conical inner faces of the disks 5 and 6. A floating spacing ring 16 of appropriate cross sectional shape is disposed between the series of tapered rollers 15, said spacing ring 16 having frictional contact with the tapered rollers and rotatably encircling the sleeve 2 in spaced relation thereto. The spacing ring 16 constitutes an idler which is rotated by frictional contact with the tapered rollers 15. The outer and inner rings 10 and 11, respectively, are rigidly secured together through the medium of screws 17 which are disposed radially between the tapered rollers 15 and which have tapered heads countersunk in the outer rings 10. The screws 17 are threaded into openings provided therefor in the inner rings 11.

It will thus be seen that the construction and arrangement of the elements is such that the bearing will function to successfully resist both longitudinal and radial thrust. The bearing may be adjusted to compensate wear by loosening the set screws 13, removing the locking pin 8 and threading the disk 6 toward the annulus 9. This operation will draw the disk 5 toward the annulus 9 by the engagement of the flange 3 on the sleeve 2 with said disk 5.

Figure 4:
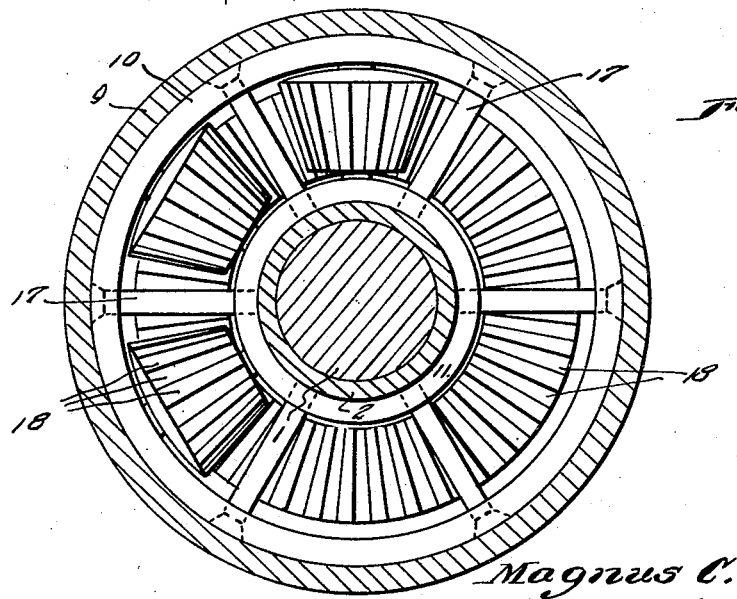
Figure 4 is a view in vertical cross section taken substantially on the line 4—4 of Figure 3, looking in the direction indicated by the arrows.

In the slightly modified form of the invention illustrated in Figures 3 and 4 of the drawings, the opposed sides of the disks 5 and 6, the tapered rollers 15 and the spacer 16 are provided with meshed teeth 18 for providing a positive drive connection between the tapered rollers and the disks and between the tapered rollers and the spacer. In all other respects the form of the invention shown in Figures 3 and 4 is similar to that illustrated in Figures 1 and 2.

In the form of the invention illustrated in Figures 5 to 8, inclusive, of the drawings, the inner peripheries of the outer rings 10 are provided with circular recesses 19 having flat inner ends or bottoms, said recesses being disposed in opposed relation to the outer ends of the tapered rollers 15. Ball thrust bearings for the tapered rollers 15 are provided and comprise the cages 20 in which the balls 21 are retained, said balls having rolling contact with the outer ends of the tapered rollers 15 and with the inner ends or bottoms of the recesses 19. The cages 20 encircle the tapered pins 14 and, of course, are provided with openings for the reception of the balls 21. The ball receiving openings of the cages 20 are designated by the reference numeral 22 in Figure 8 of the drawings.

Figure 9:
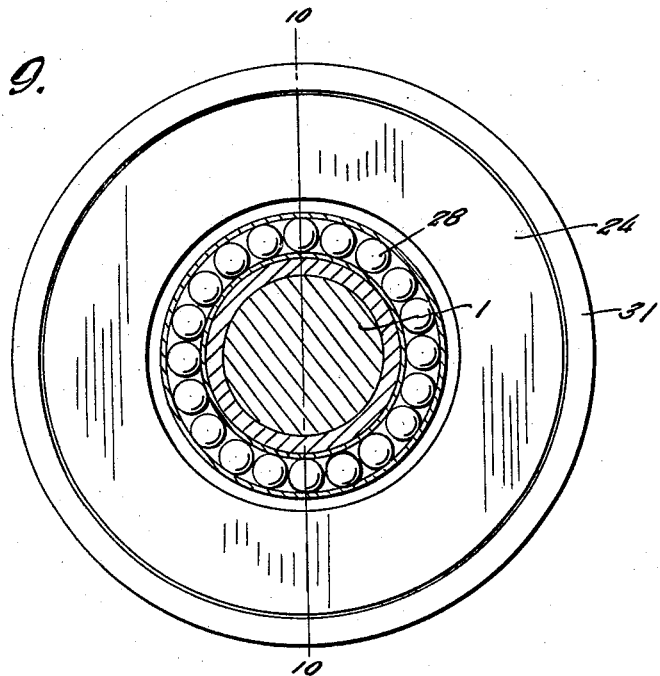
Figure 9 is a view in vertical cross section through still another modified form of the invention.
Figure 10:
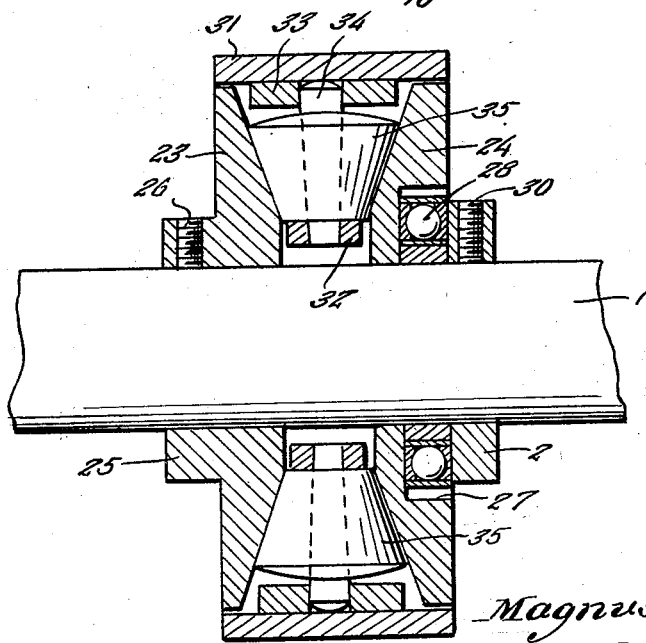
Figure 10 is a view in vertical longitudinal section taken substantially on the line 10—10 of Figure 9.

The modification illustrated by Figures 9 and 10 of the drawings comprises a pair of disks 23 and 24 which are mounted in spaced, opposed relation to each other directly on the shaft 1. The disk 23 is provided with a hub portion 25 through which a set screw 26 is threaded for engagement with the shaft 1 for securing the disk 23 in position thereon. The outer side of the disk 24 is recessed centrally, as at 27, for the reception of a ball thrust bearing 28 which is mounted on the shaft 1 and which is engaged with a collar 29 which is adjustably secured on the shaft 1 by a set screw 30. The inner or opposed faces of the disks 23 and 24 are conical. A stationary housing 31 in the form of an annulus encircles the disks 23 and 24 and has fixed therein between said disks 23 and 24 a pair of spaced, concentric inner and outer rings 32 and 33, respectively, which are rigidly secured together by screws similar to the screws 17 in the other forms of the invention.

The rings 32 and 33 are provided with radially aligned tapered openings in which the end portions of the tapered pins 34 are journaled, the outer end portions of the pins 34 being rounded and rotatably engaged with the inner periphery of the annulus 31. The inner ring 32 is of less width than the outer ring 33.

Tapered rollers 35 are mounted on the pins 34 between the inner and outer rings 32 and 33 and said rollers have rolling contact with the conical inner faces of the disks 23 and 24. It may be well to here state that the disk 24 is rotatable on the shaft 1.

The bearing shown in Figures 9 and 10 may be adjusted to compensate for wear by moving the disks 23 and 24 longitudinally on the shaft 1 toward or away from each other in the annulus 31. Adjustment of the disk 23 may be accomplished by loosening the set screw 26 while adjustment of the disk 24 may be accomplished by loosening the set screw 30 to permit movement of the stop collar 29 on the shaft 1.

It is believed that the many advantages of a bearing in accordance with this invention will be readily understood, and although the preferred embodiments of the invention are as illustrated and described, it is to be understood that further changes in the details of construction and in the combination and arrangement of parts may be resorted to which will fall within the scope of the invention as claimed.

What is claimed is:

1. A shaft bearing comprising a sleeve mounted on the shaft, said sleeve having an externally threaded end portion, an external flange on the other end of the sleeve, a disk mounted on said other end of the sleeve in abutting engagement with the flange, a disk threaded for adjustment on the threaded end portion of the sleeve and disposed in spaced, opposed relation to the first named disk, said disks having substantially conical opposed faces, a fixed annulus disposed in spaced, concentric relation to the sleeve adjacent the outer peripheries of the disks, spaced, inner and outer rings mounted in the annulus between the disks, radially disposed pins extending between the rings and having their end portions journaled therein, means rigidly connecting the rings together, tapered rollers mounted on the pins for rotation between the rings, said rollers being arranged in circular series, a floating spacing ring encircling the sleeve between the series of rollers, said rollers having rolling contact with the disks and with the spacing ring.

2. A shaft bearing comprising a sleeve mounted on the shaft, said sleeve having an externally threaded end portion, an external flange on the other end of the sleeve, a disk mounted on said other end of the sleeve in abutting engagement with the flange, a disk threaded for adjustment on the threaded end portion of the sleeve and disposed in spaced, opposed relation to the first named disk, said disks having substantially conical opposed faces, a fixed annulus disposed in spaced, concentric relation to the sleeve adjacent the outer peripheries of the disks, spaced inner and outer rings mounted in the annulus between the disks, radially disposed pins extending between the rings and having their end portions journaled therein, means rigidly connecting the rings together, tapered rollers mounted on the pins for rotation between the rings, said rollers being arranged in circular series, a floating spacing ring encircling the sleeve between the series of rollers, said rollers having rolling contact with the disks and with the spacing ring, and meshed teeth on the disks, rollers and the spacing ring for providing a positive drive therebetween.

3. A bearing comprising a pair of spaced, opposed disks mounted for adjustment toward and away from each other, said disks having substantially conical opposed faces, a fixed annulus disposed adjacent the outer peripheries of the disks, pairs of spaced inner and outer rings fixed in the annulus between the disks, radially disposed pins extending between the rings and journaled therein, tapered rollers mounted on the pins for rotation between the rings, said rollers arranged in a pair of circular series, and a floating spacing ring disposed between the series of rollers, said rollers having rolling contact with the disks and with the spacing ring.

4. A bearing comprising a pair of spaced, opposed disks mounted for adjustment toward and away from each other, said disks having substantially conical opposed faces, a fixed annulus disposed adjacent the outer peripheries of the disks, pairs of spaced inner and outer rings fixed in the annulus between the disks, radially disposed pins extending between the rings and journaled therein, tapered rollers mounted on the pins for rotation between the rings, said rollers arranged in a pair of circular series, and a floating spacing ring disposed between the series of rollers, said rollers having rolling contact with the disks and with the spacing ring, and meshed teeth on the disks, the rollers and the spacing ring for providing a positive drive connection therebetween.

In testimony whereof we affix our signatures.

MAGNUS C. LARSON.
JOHN J. VOLANSKY.